US009262257B2

(12) United States Patent
Allu et al.

(10) Patent No.: US 9,262,257 B2
(45) Date of Patent: Feb. 16, 2016

(54) PROVIDING BOOT DATA IN A CLUSTER NETWORK ENVIRONMENT

(71) Applicant: NetApp, Inc., Sunnyvale, CA (US)

(72) Inventors: NandaKumar Ravindranath Allu, Madurai (IN); Prateek Bhatnagar, Uttar Pradesh (IN); Venkata Ramprasad Darisa, Andhra Pradesh (IN)

(73) Assignee: NetApp, Inc., Sunnyvale, CA (US)

( * ) Notice: Subject to any disclaimer, the term of this patent is extended or adjusted under 35 U.S.C. 154(b) by 97 days.

(21) Appl. No.: 14/257,554

(22) Filed: Apr. 21, 2014

(65) Prior Publication Data
US 2015/0301880 A1 Oct. 22, 2015

(51) Int. Cl.
G06F 11/00 (2006.01)
G06F 11/07 (2006.01)

(52) U.S. Cl.
CPC .......... G06F 11/0793 (2013.01); G06F 11/079 (2013.01); G06F 11/0709 (2013.01)

(58) Field of Classification Search
CPC ............ G06F 11/0757; G06F 11/2038; G06F 11/1417; G06F 11/1666; G06F 11/20; G06F 11/2094; G06F 11/1456; G06F 11/1469; G06F 11/1464; G06F 9/4401; G06F 9/4408; G06F 9/4416; G06F 9/4406; H04L 49/555; H04L 49/356
See application file for complete search history.

(56) References Cited

U.S. PATENT DOCUMENTS

| 7,330,965 | B2* | 2/2008 | Chu | G06F 9/4405 713/1 |
| 7,484,084 | B1 | 1/2009 | Ranaweera et al. | |
| 7,685,281 | B1* | 3/2010 | Saraiya | G06F 13/387 370/392 |
| 7,966,515 | B2* | 6/2011 | Hatasaki | G06F 9/4406 714/4.2 |
| 8,386,838 | B1 | 2/2013 | Byan | |
| 8,407,514 | B2* | 3/2013 | Hatasaki | G06F 9/4406 714/4.1 |
| 2002/0095619 | A1* | 7/2002 | Marsh | G06F 11/1433 714/23 |
| 2002/0116485 | A1* | 8/2002 | Black | H04L 29/06 709/223 |
| 2006/0150014 | A1 | 7/2006 | Chadalavada | |
| 2007/0002730 | A1* | 1/2007 | Lu | G06F 11/0793 370/216 |
| 2007/0094426 | A1 | 4/2007 | Chiang et al. | |
| 2010/0043006 | A1 | 2/2010 | Oakes et al. | |
| 2011/0289417 | A1 | 11/2011 | Schaefer et al. | |
| 2013/0238554 | A1 | 9/2013 | Yucel et al. | |

OTHER PUBLICATIONS

"Clustered Data Ontap 8.2: Network Management Guide", Part No. 215-07972_A0, May 2013, 109 pages.

(Continued)

Primary Examiner — Nadeem Iqbal
(74) Attorney, Agent, or Firm — LeClairRyan, a Professional Corporation

(57) ABSTRACT

A computer cluster includes a group of connected computers that work together essentially as a single system. Each computer in the cluster is called a node. Each node has a boot device configured to load an image of an operating system into the node's main memory. Sometimes the boot device of a first node experiences a problem that prevents the operating system from loading. This can affect the entire cluster. Some aspects of the disclosure, however, are directed to operations that determine the problem with the first node's boot device based on a communication sent via a first communications network. Further, the operations can communicate to the first node a copy of boot data from a second node's boot device. The copy of the boot data is sent via a second communications network different from the first communications network. The copy of the boot data can solve the first boot device's problem.

20 Claims, 7 Drawing Sheets

(56) References Cited

OTHER PUBLICATIONS

"NetApp 10G Cluster-Mode Switch Installation Guide", Jul. 2013, 58 pages.
"NetApp CN1610 Cluster Switch Technical Specifications", 2013, 3 pages.
Minyard, "IPMI—A Gentle Introduction with Open IPMI", Feb. 10, 2006, 238 pages.

* cited by examiner

PROVIDING BOOT DATA IN A CLUSTER NETWORK ENVIRONMENT

BACKGROUND

Aspects of the disclosure generally relate to the field of networks and, more particularly, to cluster network environments.

Computer users, especially in the businesses world, produce an ever-increasing amount of digital data. Consequently, there is an ever-increasing need to store and access that digital data in a way that is efficient and cost effective. Techniques and mechanisms that facilitate efficient and cost effective storage of vast amounts of digital data are, therefore, critical to the success of business entities and consumers.

Some companies, such as NetApp Inc., provide data storage solutions. NetApp Inc. provides storage systems with exceptionally high reliability, availability, and performance. For instance, NetApp Inc. has some solutions that leverage data virtualization and computer clustering to provide unified, flexible, and scalable storage solutions. For example, NetApp Data ONTAP® 8 operating system can control a group of data storage devices in a cluster network environment, also referred to as a clustered storage environment or a cluster of storage appliances. A cluster network environment comprises a plurality of nodes (e.g., storage servers, computing devices, etc.) that are connected together in a secure, private network (cluster network). The cluster network permits the networked nodes to communicate information to each other securely and rapidly. The nodes may cooperate together as a single coherent storage system.

However, as reliable as some storage systems can be, sometimes they experience problems and failures. Because of the importance of having an available data storage system, the ability to recover from the problems and failures is relevant to the value of the storage system.

BRIEF DESCRIPTION OF THE DRAWINGS

Aspects of the disclosure may be better understood, and numerous objects, features, and advantages made apparent to those skilled in the art by referencing the accompanying drawings.

DETAILED DESCRIPTION OF THE DISCLOSURE

Figure 1:
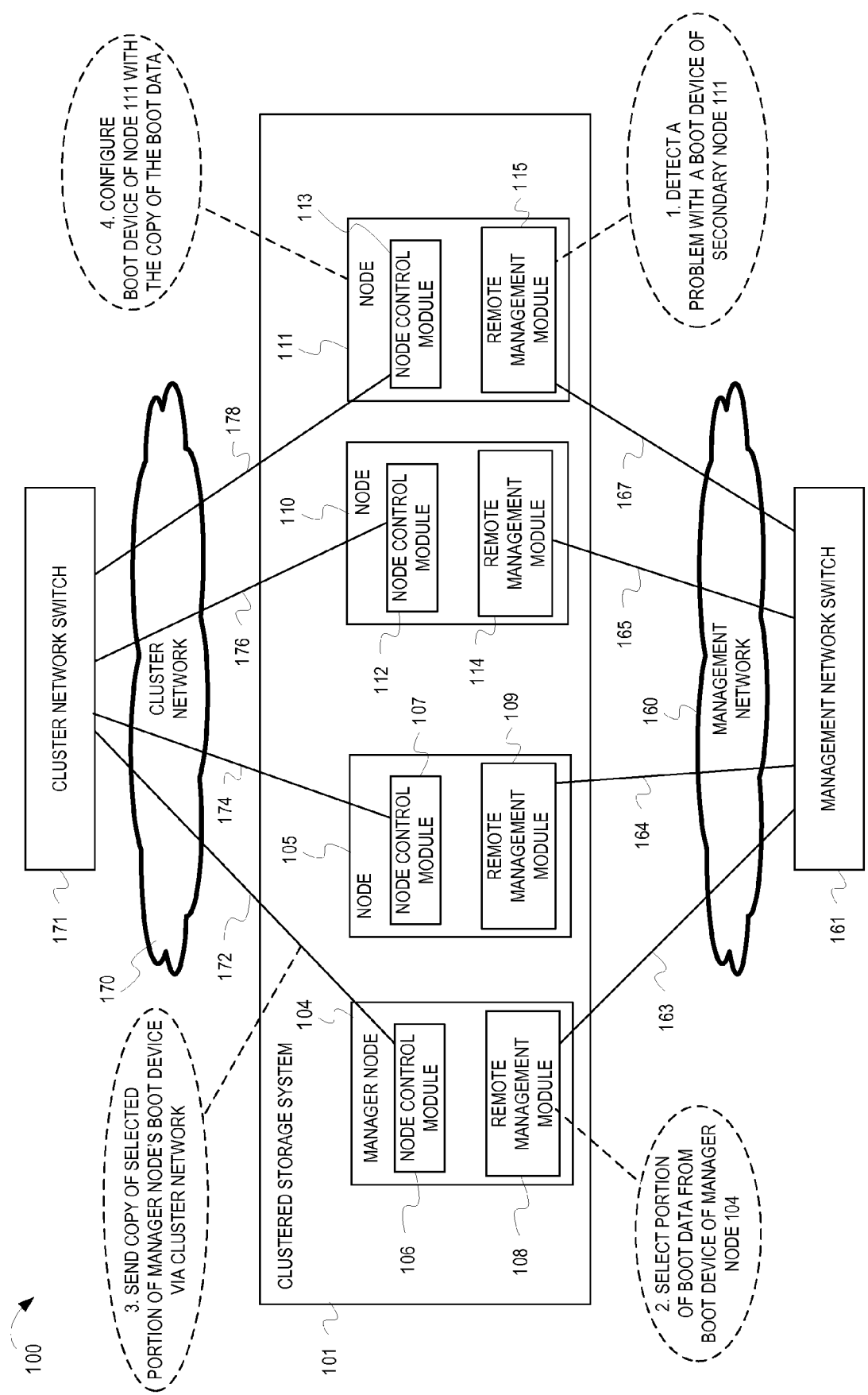
FIG. 1 depicts a diagram of an example of correcting a boot device problem in a cluster network environment.

The description that follows includes exemplary systems, methods, techniques, instruction sequences and computer program products that embody techniques of the inventive subject matter. However, it is understood that aspects of the disclosure may be practiced without these specific details. For instance, although examples refer to clustered storage devices, some aspects of the disclosure may relate to other forms of devices in various types of computer clusters. In other instances, well-known instruction instances, protocols, structures and techniques have not been shown in detail in order not to obfuscate the description.

Boot devices are devices used to boot a computer. For example, when a computer is powered up (e.g., when a user presses a power button on the computer), a small computer program (e.g., the Basic Input/Output System (BIOS) stored in a read-only memory device (ROM)), automatically runs, which, in part, causes the boot device to initiate a boot loading procedure. The boot loading procedure accesses and loads an image of an operating system into the computer's main memory so that the computer can run its normal operations.

In some instances, the boot device is a modular hardware device, such as a non-volatile storage device or memory disk (e.g., a memory card that includes a high capacity solid-state flash memory and an on-card controller that allows a host computer to issue commands to the memory card to read or write blocks of memory). As mentioned previously, sometimes certain hardware or software components of a storage system can experience problems and failures. For instance, the boot device can experience a hardware or software problem, which can result in either partial errors or complete failures in the boot device or the boot loading procedure. When the boot device experiences problems, the boot device may fail to load the operating system on the computer. In the case of a computer cluster, when one of the nodes in the cluster fails to load its operating system, then the computer cluster loses one of its nodes until the boot device can be repaired or replaced. Certain computer clusters, like a clustered storage system, rely on all of the nodes being functional to ensure proper data synchronization and data storage integrity. Thus, if one boot device fails for a node in the clustered storage system, the entire clustered storage system experiences problems. Therefore, the ability to correct problems with a boot device is useful in a computer cluster, such as a clustered storage system.

Some aspects of the disclosure are directed to operations that determine a problem with a first node's boot device based on a first communication sent to a second node via a first communications network. Further, the operations can communicate to the first node a copy of boot data from the second node's boot device. The copy of the boot data is sent via a second communications network different from the first communications network. The copy of the boot data can be used by the first node to solve the problem with the first node's boot device.

FIG. 1 depicts a diagram of an example of correcting a boot device problem in a cluster network environment. In FIG. 1, a group of data storage appliances, such as storage controllers or storage servers, are connected together in a clustered storage system 101 (also referred to herein as a computer cluster) as part of a cluster network environment 100. Each of the storage appliances are referred to as nodes 104, 105, 110, and 111. The nodes 104, 105, 110, and 111 connect to each other via a cluster network 170, which includes a cluster network switch 171. Cluster interconnects 172, 174, 176, and 178, interconnect node control modules 106, 107, 112, and 113 of each of the nodes 104, 105, 110, and 111. The node control modules 106, 107, 112, and 113 control the primary functions of each of the nodes 104, 105, 110, and 111, including the functions pertaining to data storage of the nodes 104, 105, 110, and 111. The node control modules 106, 107, 112, and 113 run separate instances of an operating system (e.g., the NetApp Data ONTAP® 8 operating system). In some examples, the clustered storage system 101 includes storage equipment that can include any number of storage devices (e.g., tape drives, disk drives, etc.), storage controllers, etc. The clustered storage system 101 can implement block based storage (e.g., a storage area network (SAN)), a file based storage system (e.g., network attached storage (NAS)), a combination of SAN and NAS, etc. In some examples, the clustered storage system 101 provides storage virtualization, such as via use of a virtualized clustered storage array or virtual storage servers.

Figure 2:
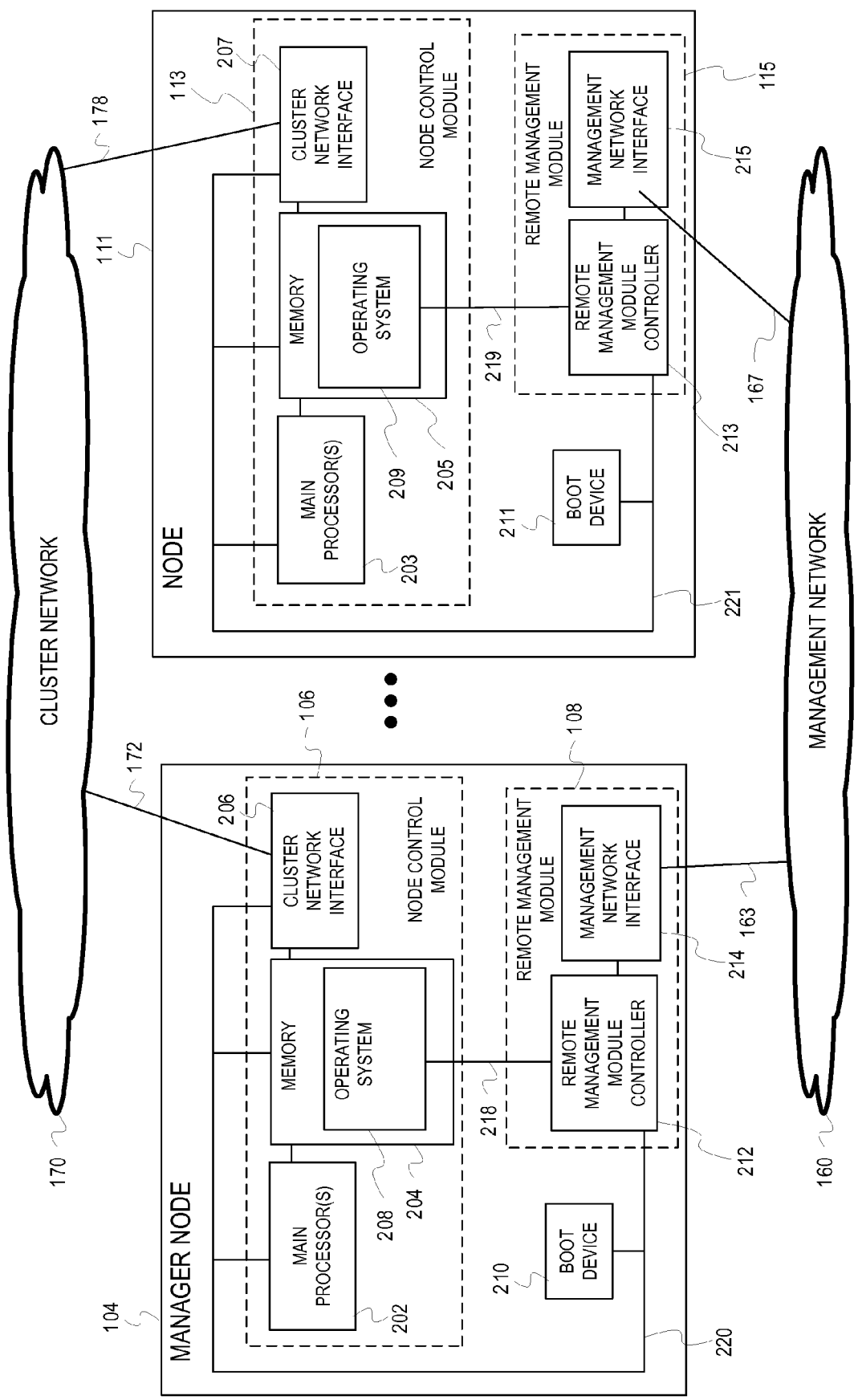
FIG. 2 depicts an example architectural diagram of some of the elements described in FIG. 1.

The nodes 104, 105, 110, and 111 are also connected via remote management modules 108, 109, 114, and 115. Each of the remote management modules 108, 109, 114, and 115 includes a dedicated microprocessor ("processor"), which is integrated into the motherboard of every node 104, 105, 110, and 111 in the clustered storage system 101. Specific hardware components of the node control modules 106, 107, 112, and 113 (e.g., memory units, central processing unit(s), power units, buses, etc.) are also connected to the same respective motherboards to which the remote management modules 108, 109, 114 and 115 are connected. The node control modules 106, 107, 112 and 113 include one or more of hardware, software, logical groupings of hardware, or any combination thereof. FIG. 2, which will be described in further detail below in connection with FIG. 1, shows some components of the node control module 106 and the node control module 113 (e.g., which includes hardware, such as processors and a memory, as well as software, such as an operating system).

Still referring to FIG. 1, the node control module 106 and the remote management module 108 are both connected to the same motherboard associated with the node 104, and therefore share the same power source that feeds all components of the motherboard. However, the remote management modules 108, 109, 114, and 115 are configured to function independently from the main hardware and software components of the node control modules 106, 107, 112, and 113. For instance, the remote management modules 108, 109, 114, and 115 function independently of the instances of an operating system utilized respectively by the node control modules 106, 107, 112, and 113. Therefore, as long as any of the nodes 104, 106, 110 and 111 is connected to the power source that feeds power to its respective motherboard, the respective remote management module 108, 109, 114 or 115 continues to function even when any given one of the node control modules 106, 107, 112, and 113 fails to function properly. Because the remote management modules 108, 109, 114, and 115 are continuously running independent of the node control modules 106, 107, 112, and 113, and because they include independent functionality from the node control modules 106, 107, 112, and 113, the remote management modules 108, 109, 114, and 115 are continuously ready to assist with resolution of diagnostic, repair and monitoring problems of the components utilized by the node control modules 106, 107, 112, and 113. Therefore, in some examples, the remote management modules 108, 109, 114, and 115 may be referred to as "out-of-band" management modules or "out-of-band" microprocessors referring to their specialized functions to remotely perform diagnostics, repairs, and monitoring of the components of the nodes 104, 105, 110, and 111. Examples of remote diagnostic, repair and monitoring functionality include remote sensor monitoring, remote event logging, remote administration, remote non-stop operation, remote firmware updates, remote hardware assisted takeover, etc.

For security and traffic control reasons, the remote management modules 108, 109, 114, and 115 are restricted from communicating via the cluster network 170. The node control modules 106, 107, 112, 113 communicate with each other using the cluster network 170. The node control modules 106, 107, 112, 113 use the cluster network 170 to transfer their storage data, and to synchronize their operations. As stated previously, the remote management modules 108, 109, 114, and 115 do not perform the functions of the nodes 104, 105, 110, and 111, for data storage, synchronization, etc. Rather, the remote management modules 108, 109, 114, and 115 perform diagnostic, repair, and monitoring functions. If the remote management modules 108, 109, 114, 115 were to use the cluster network 170 to perform their diagnostic, repair, and monitoring functions, their communications could interfere with the transfer of the storage data and/or the synchronization of operations by the node control modules 106, 107, 112, and 113. The interference with the communications between the node control modules 106, 107, 112, 113 could cause significant delays and/or could cause data integrity problems with the stored and synchronized data on the nodes 104, 105, 110, and 111. Therefore, the remote management modules 108, 109, 114, and 115 are restricted from communicating via the cluster network 170. To perform their diagnostic, repair and monitoring functions, the remote management modules 108, 109, 114, and 115 communicate with each other via a management network 160. More specifically, each of the remote management modules 108, 109, 114, and 115 connect to a management network switch 161 via management network links 163, 164, 165, and 167.

The cluster network 170 and the management network 160 are different in many ways. For example, the cluster network 170 is a data network that makes use of a cluster fabric (e.g., cluster fabric topologies, encoding, protocols, etc.) for transmitting data between the node control modules 106, 107, 112, and 113. A cluster fabric is a network structure that connects network nodes via one or more switches (a "cluster-fabric switch") to spread network traffic across multiple physical links ("switched-fabric links") that provide point-to-point bidirectional serial communications between any two given nodes. A cluster-fabric switch manages the state of the communications between nodes and ensures that traffic between any two given ports flows through the switch only, yet at any given time, multiple pairs of ports may communicate simultaneously in the cluster fabric. Further, the cluster-fabric switch can ensure that failure of a port is isolated and should not affect operation of other ports. Some examples of cluster fabrics technologies include the Fibre Channel® network technology, the InfiniBand® network technology, or the 10G Ethernet network technology. Some technologies, such as the Fibre Channel (FC) network technology, provide many-to-many communications, device name lookups, computer security, and redundancy. An FC switch can also implement zoning, a mechanism that partitions the cluster fabric into smaller subsets.

On the other hand, the management network 160 is a network that does not use cluster fabric technologies. Rather, the management network 160 utilizes a non-cluster fabric networking protocol, such as the Transmission Control Protocol (TCP) or the Internet Protocol (IP) (e.g., IP version 4 (IPv4) or IP version 6 (IPv6)).

Further, the cluster network 170 is a high-speed network that provides communication capabilities at a higher speed than that of the management network 160. For instance, the management network 160 provides communications at about 1 gigabit per second whereas the cluster network 170 is capable of communications at more than 1 gigabit per second (e.g., 10 gigabits per second or higher). Further, the cluster network 170 provides network communication with a very high protocol data unit size (e.g., 9000 maximum transmission unit (MTU)) relative to a protocol data unit size for the management network 160.

One of the nodes, node 104, is elected as a "manager" node in a quorum of devices in a computer cluster. Hence, the node 104 will be referred to hereafter as the manager node 104. The manager node 104 performs management and coordination functions for all the nodes 104, 105, 110, and 111. For example, the manager node 104 is responsible for synchronizing information across the clustered storage system 101 so that the node control modules 106, 107, 112, and 113 do not modify data in divergent ways. In other instances, the manager node 104 performs job scheduling, cluster monitoring, cluster reporting, user account management, replication, and other such functions. The manager node 104 is selected by a voting protocol where each of the nodes 104, 105, 110 and 111 elects one of the nodes 104, 105, 110 and 111 as the manager. Each node that is not the manager node 104 is referred to herein as either a "secondary" node, a "target" node, or simply a "node."

Each of the nodes 104, 105, 110 and 111 includes a boot device. A boot device is used to boot up each of the nodes 104, 105, 110 and 111. For example, the boot device includes an image of the operating system used by each of the node control modules 106, 107, 112, and 113. The boot device loads the operating system when a node is booted. The description at this point will temporarily refer to FIG. 2 to illustrate examples of boot devices, and other components, in the manager node 104 and one of the secondary nodes (i.e., node 111) to give context to the remainder of the description of FIG. 1. Thus, after the description of FIG. 2, the description will refer back to FIG. 1 to illustrate example operations involved in correcting a problem with a boot device of the node 111.

FIG. 2 illustrates an example architecture for the various nodes 104, 105, 110 and 111. Referring temporarily to FIG. 2, FIG. 2 illustrates that the node control module 106 includes one or more main processors ("main processor(s) 202") connected to a memory 204 and a cluster network interface 206 via one or more communication buses. The main processor(s) 202 may also be referred to herein as a central processing unit, or CPU. The remote management module 108 includes a management network interface 214 and a remote management module controller 212 connected to each other on a motherboard of the manager node 104.

The manager node 104 also includes a boot device 210. When the manager node 104 starts up, or boots, among other initial booting procedures, the boot device 210 causes a copy of an operating system 208 to load into the memory 204 so that the operating system 208, in connection with the main processors(s) 202, can perform its primary functions of providing data storage and/or managing the nodes in the clustered environment. In some examples, the boot device 210 includes a primary and secondary set of system files, such as a primary image of an operating system and a secondary, or backup, image of an operating system (e.g., a copy of the primary image or a copy of a last version of the operating system before an upgrade). In some examples, the boot device 210 also includes additional information used for system booting, such as boot loader instructions, files and programs related to a file system, diagnostic tools, firmware for the boot device, etc.

The remote management module controller 212 includes a processor and memory separate from that of the node control module 106. The remote management module controller 212 is configured to communicate with the operating system 208 using Intelligent Platform Management Interface (IPMI) messaging. IPMI is a message-based, hardware-level interface specification configured to operate independently of the operating system 208. For example, the remote management module controller 212 includes a separate operating system, kernel, etc., from the operating system 208. The remote management module controller 212 is configured to send the IPMI messages to the operating system 208 via a serial connection 218. The operating system 208 is configured to receive the IPMI messages via the serial connection 218 and generate commands for the components of the node control module 106. The operating system 208 is further configured to generate IPMI messages and send them to the remote management module controller 212 via the serial connection 218.

The remote management module controller 212 is configured to perform the remote management functions related to diagnostics, repair, and monitoring, which are separate from the primary functions performed by the operating system 208 of the node control module 106. The remote management module controller 212 is also configured to perform functionality related to the boot device 210. For example, the remote management module controller 212 is configured to detect a status of the boot device 210, write data to the boot device 210, delete data from the boot device 210, format the boot device 210, and initiate a reboot of the manager node 104 so that the boot device 210 can load the operating system 208. Further, the remote management module controller 212 communicates with the boot device 210 to customize a portion of the boot data for the manager node 104. For example, the remote management module controller 212 creates customized configuration data about hardware, software, or functionality that is specified for the manager node 104. Some examples, of customized configuration data includes data with a serial number for the manager node 104, one or more checksum data of the manager node 104, data about hardware devices connected to the manager node 104, data about particular functions of the manager node 104 as a manager of other nodes, etc. The remote management module controller 212 is further configured to run a diagnostic service, initiate the diagnostic service on secondary nodes, and halt a secondary node. The remote management module controller 212 is also configured to determine when the boot device 211 experiences a problem. After determining that the boot device 211 experiences the problem, the remote management module 212 is configured to communicate with the operating system 208, to select a portion of boot data from the boot device 210 and transfer the portion of boot data via the cluster network 170 to node 111. The remote management module controller 212 is further configured to communicate with other devices within the manager node 104 via connections 220 that utilize the Inter-Integrated Circuit ($I^2C$) communications interface. The $I^2C$ is a multimaster, serial, single-ended computer bus.

The node 111 includes an equivalent architecture to that of the manager node 104, although it may function differently based on its given role as a secondary node. Because the node 111 includes an equivalent architecture to that of the manager node 104, if the node 111 were to be elected as a manager node, then the node 111 could perform equivalent functionality to that performed by the manager node 104. For example, the node control module 113 for the node 111 also includes one or more main processors ("main processor(s) 203") connected to a memory 205 and a cluster network interface 207 via one or more communication buses. The remote management module 115 also includes a management network interface 215 and a remote management module controller 213 connected to each other on a motherboard of the node 111. The remote management module controller 213 includes a processor and memory separate from that of the node control module 113. The node 111 also includes the boot device 211. In some cases, when the node 111 boots, among other initial booting procedures, the boot device 211 causes an image of an operating system 209 (equivalent to operating system 208) to load into the memory 205 so that the operating system 209, in connection with the main processors(s) 203, can perform its primary functions of storing data and communicating with the manager node 104 in the clustered environment. The remote management module controller 213 is also configured to communicate with the operating system 209 using IPMI messaging via one or more serial communications 219.

The remote management module controller 213 is further configured to perform the remote management functions related to the previously mentioned diagnostics, repair, and monitoring functions, which are separate from the primary functions performed by the operating system 209 of the node control module 113. The remote management module controller 213 is also configured to perform functionality related to the boot device 211. For example, the remote management module controller 213 is configured to initiate a reboot of the node 113 and/or format the boot device 211. The remote management module controller 213 is further configured to run a diagnostic service (initiated by the manager node 104) to monitor the state of the boot device 211. Furthermore, the remote management module controller 213 is configured to communicate with other devices within the node 111 via connections 221 that utilize the I²C communications interface. For example, in instances when the boot device 211 has failed and/or when the operating system 209 is not loaded into the memory 205, the remote management module controller 213 is configured to access communications received through the cluster network interface 207. Specifically, the cluster network interface 207 is configured to receive a copy of the boot data from the manager node 104 via the cluster network 170 using a cluster fabric protocol. The remote management module controller 213 is connected to the cluster network interface 207 via connections 221. Therefore, even though the remote management module controller 213 cannot communicate via the cluster network 170, it can still access data from the cluster network 170 received via the cluster network interface 207. Furthermore, the remote management module controller 213 communicates with the boot device 211, using the I²C communications protocol, to write the copy of the boot data (received via the cluster network interface 207) to the boot device 211.

Referring back to FIG. 1, an example scenario will now be described that involves communication of boot data between the manager node 104 and the node 111 in the clustered storage system 101 to correct a problem with a boot device of the node 111 (e.g., to correct a problem with the boot device 211 shown in FIG. 2). Specifically, the remote management module 108 initiates a diagnostic service (mentioned in FIG. 2) on the manager node 104 and on all of the secondary nodes 105, 110, and 111. The remote management module 108 is configured to communicate with each of the remote management modules 109, 114, and 115 of the secondary nodes 105, 110, and 111 via the management network 160. The diagnostic service tracks the state of the secondary nodes 105, 110, and 111 via communications between the remote management module 108, and the remote management modules 109, 114, and 115. The remote management modules 109, 114, and 115 report their status to the remote management module 108 using the diagnostic service.

At a first stage (i.e., stage "1"), the remote management module 108 detects, via the diagnostic service, a problem with a boot device of the node 111. The problem with the boot device of the node 111 may be related to hardware (e.g. a corrupt compact flash card of the boot device) or software (e.g., a corrupt image of boot data, such as a corrupted version of an operating system for the node 111, bad sectors in a compact flash card, unsupported versions of firmware, etc.).

At a second stage (i.e., stage "2"), after detecting the problem with the boot device of the node 111, the remote management module 108 selects a portion of boot data from a boot device of the manager node 104. The remote management module 108 selects only the portion of data from the boot device of the manager node 104 that would be required by the node 111 to repair or rewrite its boot device, including only data needed to manage and boot the node. For example, as mentioned in FIG. 2, the boot device 210 may include customized data and non-customized data. Examples of customized data includes configuration data with a serial number for the manager node 104, checksum data of the manager node 104, certain customized configuration data unique to the hardware, software, or functionality of the manger node 104, etc. Examples of non-customized data includes primary and secondary images of an operating system, boot loader instructions, files and programs related to a file system, diagnostic tools, boot device firmware data, etc. In some aspects of the disclosure, the remote management module 108 selects only the non-customized data from the boot device of the manager node 104 that the node 111 would need if the node 111 were to be elected as a manager node (e.g., select the primary and secondary images of the operating system, boot loader instructions, files and programs related to a file system, diagnostic tools, boot device firmware data, etc.). The remote management module 108, however, would not select the customized data that is custom to the manager node 104.

At a third stage (i.e., stage "3"), the remote management module 108 initiates a transmission of a copy of the selected portion of the boot data from the boot device of the manager node 104. The copy of the boot data is sent via the cluster network 170, which is very rapid and secure. Furthermore, because the manager node 104 has been elected as the manager, it has the most current and complete software and firmware (e.g., highest versions of firmware and software) amongst the nodes 104, 105, 110 and 111. Because the manager node 104 has the most up-to-date boot data, it provides to the node 111 boot data which is current (e.g., the most current versions of the operating system, firmware, diagnostic applications, etc.).

At a final stage (i.e., stage "4"), the remote management module 115 detects the receipt of the copy of the boot data from the manager node 104. The remote management module 115 uses the copy of the boot data to repair, rewrite and/or configure its own boot device. The example operations described in FIG. 1, and in other aspects of the disclosure described herein, may be referred to as a one-way synchronization of data between the manager node 104 and the node 111. During the one-way synchronization, the data from the manager node 104 is copied to the node 111 to ensure that the manager node 104 and the node 111 have a consistent set of data in at least a portion of their respective boot devices.

Figure 3:
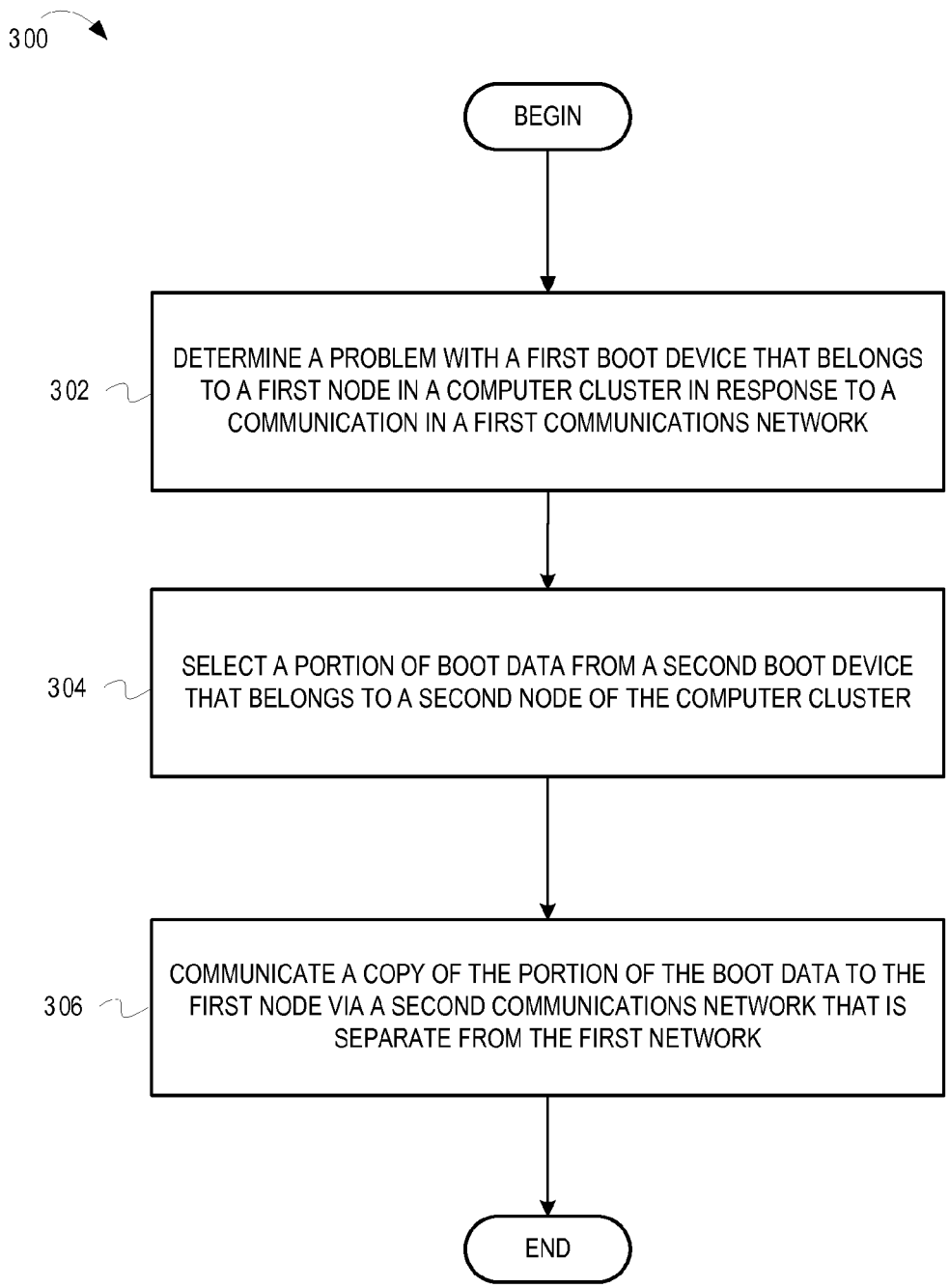
FIG. 3 depicts a flow diagram 300 illustrating providing boot data between nodes in a cluster network environment.

FIG. 3 depicts a flow diagram 300 ("flow 300") illustrating providing boot data between nodes in a cluster network environment. The example operations depicted in FIG. 3 could be performed by a program included in one or more remote management modules of computing devices connected as nodes in a computer cluster. Therefore, the flow 300 of FIG. 3 is described as being performed by a remote management module.

In flow 300, at processing block 302, a remote management module determines a problem with a first boot device that belongs to a first node of a computer cluster in response to a communication in a first communications network. In some aspects of the disclosure, the communication is between a remote management module ("first RMM") of the first node and a remote management module ("second RMM") of a second node of the computer cluster. Furthermore, in some aspects of the disclosure, the first communications network is a management network by which the first RMM and the second RMM communicate with each other regarding remote management, such as for diagnostics, repair, and maintenance purposes. Some examples of a first RMM and a second RMM were described in FIGS. 1 and 2 above, wherein the remote management module 108 communicates with the remote management module 115 via the management network 160. In some aspects of the disclosure, the first RMM is associated with a secondary node in a computer cluster and the second RMM is associated with manager node of the computer cluster. The second RMM runs a diagnostic service that monitors a state of the second node's boot device. The second RMM also sends a command to the first RMM to initiate the same diagnostic service. The first RMM uses the diagnostic service to monitor the state of the first node's boot device. The first RMM then communicates the state of the first node's boot device to the second RMM using the diagnostic service. For example, the diagnostic service is an application capable of process-to-process communications (e.g., inter-process communications or inter-application communications) across an Internet Protocol (IP) computer network. Thus, the diagnostic service run by the first RMM can communicate with a diagnostic service run by the second RMM via the management network using the IP communication protocol. The diagnostic service monitors conditions and events related to a boot device and a booting procedure. For instance, the diagnostic service of the first node monitors the booting operations of the first node's BIOS and/or boot loader operations of the first boot device. In some examples, the diagnostic service can detect problems with finding, loading, or starting the node's operating system. The problems may relate to hardware or software of the boot device. For example, the diagnostic service can detect a hardware error when the boot device is inaccessible or cannot be read. In another example, the diagnostic service can detect a software error when the boot device can be read, but the operating software will not load or run properly. The diagnostic service can record the problems and store the problems in a log. Furthermore, the diagnostic service is configured to generate a message about the problem and send the message across the management network to a network address associated with the second RMM of the manager node. The second RMM reads the message and based on the information in the message determines what the problem is with the first boot device. For instance, the second RMM detects a name, identifier, or type of a problem included in the message and performs a look-up in a file stored on the second RMM to determine the meaning of the name, identifier, or type.

At processing block 304, the remote management module selects a portion of boot data from a second boot device that belongs to the second node.

In some aspects of the disclosure, the remote management module determines that the problem with the first boot device is resolvable with only a portion of boot data from the second boot device of a second node. Then, the remote management module selects the portion of the boot data from the second boot device that the first node can use to repair or rewrite its own boot device and successfully boot the first node. For instance, after determining that the first boot device has a problem, the remote management module can select a portion of the boot data from the second boot device that corresponds to an extent of the problem with the first boot device. For example, before selecting the portion of the data from the second boot device, the remote management module can detect that first data from the first boot device is corrupt or outdated while other data from the first boot device is not corrupt or outdated. For instance, the remote management module detects that the primary image of an operating system stored in the first boot device is corrupt, but not several other items in the first boot device such as a secondary image of the operating system, firmware for the boot device, a diagnostic tool, etc. Thus, the remote management system determines that the extent of the problem with the first boot device was corruption to only one item in the first boot device, and not to several other items in the first boot device. The remote management module would then select a corresponding primary image of the operating system from the second boot device and not several other corresponding items from the second boot device, such as a corresponding secondary image of the operating system, corresponding boot device firmware data, a corresponding diagnostic tool, etc. In another example, the remote management module can determine that all data from the first boot device is unreadable or inaccessible, such as from complete data corruption (e.g., bad sectors in a compact flash card used as the boot device) or from hardware failure of the first boot device's hardware. Thus, the remote management module determines that the extent of the problem with the first boot device was more significant than corruption or outdated versions of one or several items. In such an example, the remote management module selects all of the data from the second boot device other than customized configuration data.

In yet another example, the remote management module can determine an extent to the problem from the first boot device by determining types of operations or functions that the first node can or cannot perform during the booting sequence. Based on the types of operations or functions that the first node could or could not perform, the remote management module can select portions of data from the second boot device and/or determine which operations to perform. For instance, the remote management module detects that the boot loader program on the first boot device finds the operating system image and loads it, but the operating system fails to start. The remote management module, therefore, determines that the extent of the problem with the first boot device was not related to reading the first boot device but with corrupt data on the first boot device. The remote management module can then determine to not format the first boot device. Further, the remote management module can select from the second boot device only the data that corresponds to an image of the operating system. On the other hand, if the remote management module detects that the first boot device is unreadable, then the remote management module can determine to reformat the first boot device. Further, the remote management can select all of the non-configured data on the second boot device to send to the first boot device after it has been formatted.

In some aspects of the disclosure, the remote management module can search for and select boot data from the second boot device based on names of items that were corrupt or outdated on the first boot device. For instance, if the name of a diagnostic tool in the first boot device is outdated, the remote management module can search for, and select, a diagnostic tool in the second boot device with the same name.

In some aspects of the disclosure, the remote management module can select only non-configured or "generic" boot data and not select boot data that has been configured or customized specifically for the second node. Some examples of non-configured or "generic" boot data from the second boot device includes a boot image, boot device firmware data, etc. Some examples of boot data that is configured, and therefore, would not be selected from the second boot device includes checksum related data, data related to specific devices connected to the second node, and data about unique functionality of the second node.

At processing block 306, the remote management module communicates a copy of the portion of the boot data to the first node via a second communications network that is separate from the first communications network. For example, the second communications network may be a cluster network by which node control modules communicate information related to data storage, data synchronization, etc. In contrast, the first communications network may be a management network by which remote management modules communicate information related to diagnostics, repair and maintenance.

In some examples, the remote management module is configured to communicate with an operating system of the second node and cause the second node to transmit the portion of the boot data to the first node via the second communications network. Further, a remote management module of the first node can be configured to use the copy of the boot data from the second node to configure the first boot device. For example, the remote management module of the first node ("first RMM") writes the copy of the boot data from the second node to the first boot device using connections on the first node's motherboard that utilize the $I^2C$ communications interface. The first RMM then powers up the first node. After the first node powers up, the first node initiates a small computer program (e.g., the BIOS) which causes the boot device to initiate a boot loader (i.e., boot loading instructions included in the copy of the boot data written to the first boot device). The boot loader accesses the image of the operating system also stored in the copy of the boot data and loads the image of the operating system into the main memory of the first node. Concurrently, the first RMM generates and writes customized boot data for the first node to the first boot device.

In some aspects of the disclosure, the remote management module is further configured to determine a type of the problem for the first boot device and, based on the type of the problem, send commands to the first node to perform specific operations, such as halting the first node and formatting the first boot device.

Figure 4:
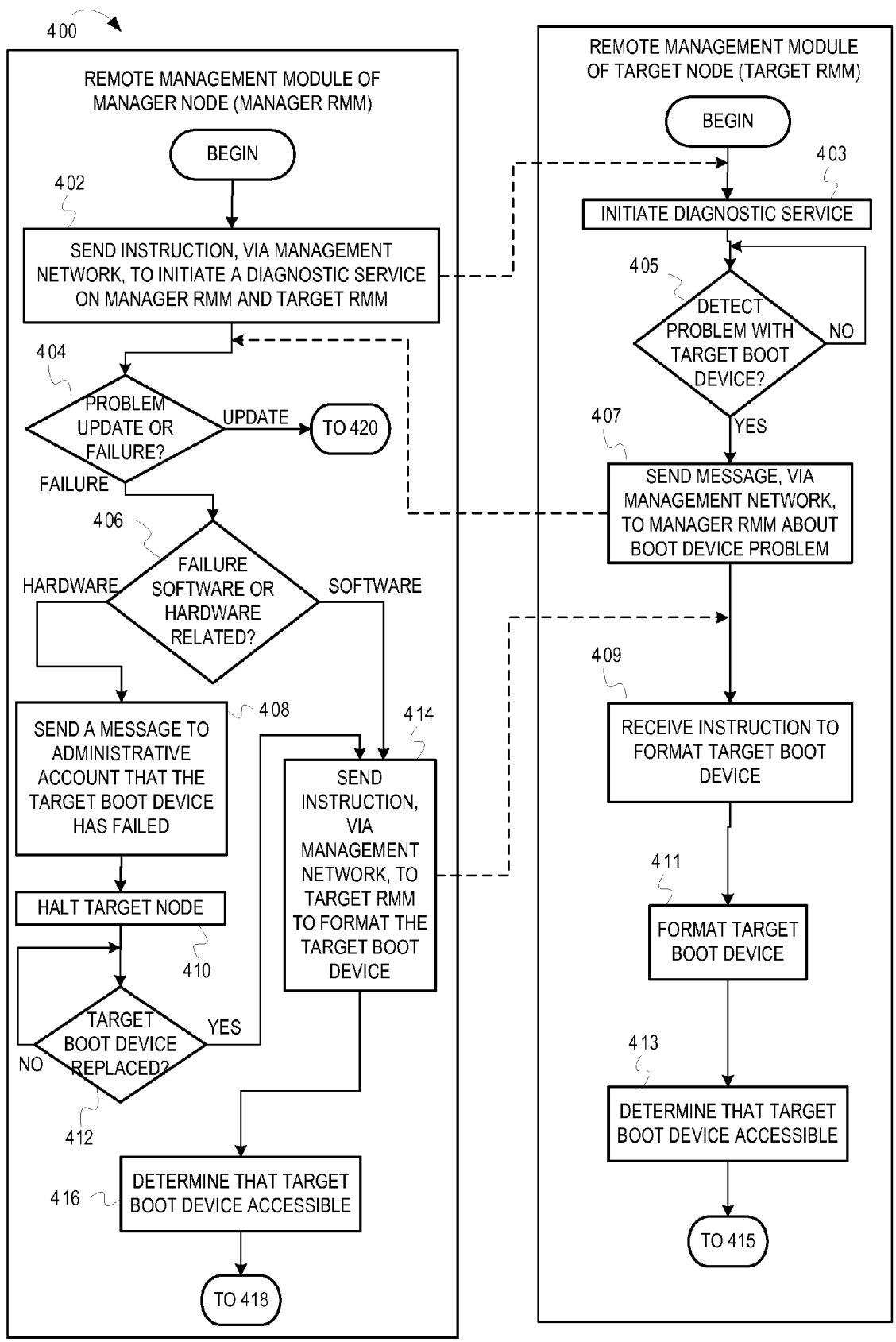
FIGS. 4 and 5 depicts a flow diagram 400 illustrating providing boot data between a manager node and a target node in a cluster network environment via communications in a management network.
Figure 5:
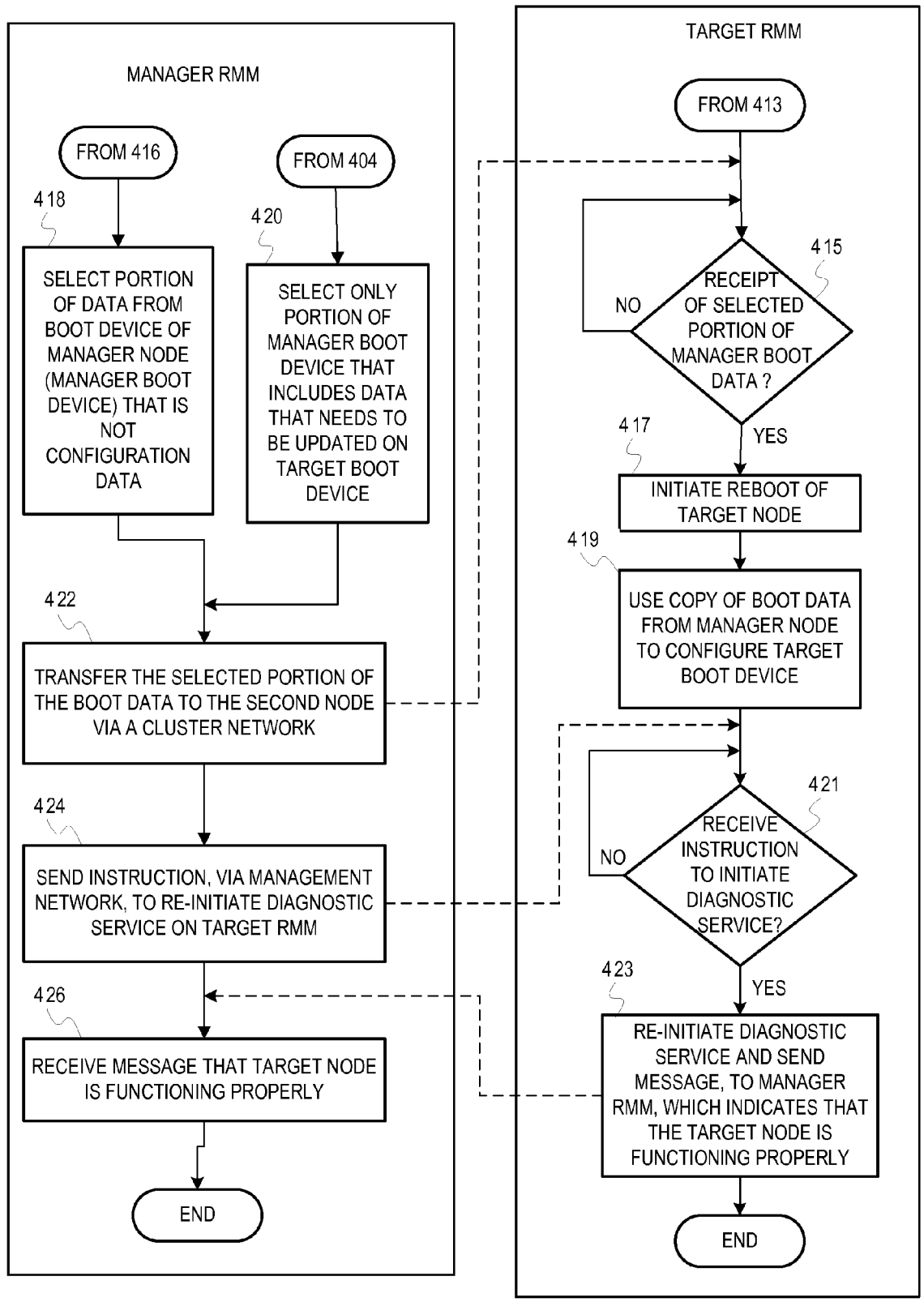

FIGS. 4 and 5 depict a flow diagram 400 ("flow 400") illustrating providing boot data between a manager node and a target node in a cluster network environment via communications in a management network. The flow 400 includes processing performed by two separate remote management modules: a remote management module of a manager node ("manager RMM") and a remote management module of a secondary or "target" node ("target RMM").

In FIG. 4, the flow 400 begins at processing block 402 where the manager RMM sends an instruction, via a management network, to initiate a diagnostic service on the manager RMM and the target RMM. The manager RMM initiates the diagnostic service.

At processing block 403, the target RMM receives the instruction from the manager RMM and the target RMM initiates the diagnostic service.

At decisional processing block 405, the target RMM determines whether a problem occurs with its own boot device (referred to as either the "target node boot device" or "target boot device"). If the target RMM does not detect a problem with the target node boot device, the flow 400 loops at processing block 405 until a problem is detected by the diagnostic service. If, at processing block 405, the target RMM does detect the problem with the boot device, the flow 400 continues at processing block 407.

At processing block 407, the target RMM sends a message about the problem with the target node boot device to the manager RMM via the management network. For example, the target RMM sends the message to the manager RMM using the diagnostic service. For example, a first process associated with the diagnostic service run by the target RMM sends messages, via an IP communication, to a second process associated with the diagnostic service running on the manager RMM.

At decisional processing block 404, the manager RMM receives the message about the problem with the target node boot device and determines whether the problem concerns a failure associated with the target node boot device (e.g., a hardware or software failure), or whether the problem concerns a required update to only a portion of the target node boot device. For example, a diagnostic service on the target RMM monitors the state of the target boot device. In some instances, the diagnostic service on the target RMM detects signals sent from sensors within the first node associated with the boot device. The signals may indicate hardware problems with the boot device. In other instances, the diagnostic service on the target RMM detects events generated by a boot loader program when the boot loader program attempts, and fails, to read data from the boot device. Each of the signals or events has a problem code associated with it. The diagnostic service on the target RMM detects the problem code for any given signal or event and writes the problem code into a message. The diagnostic service on the target RMM then sends the message to the manager RMM. The manager RMM receives the message and reads the problem code (e.g., parses the message for a problem code, searches for a problem code, etc.). The manager RMM looks up the problem code in a list of problem codes stored in a memory of the manager RMM (e.g., stored in a file or database of problem codes). The list of problem codes indicates whether the problem code from the message pertains to a hardware failure or software failure. In some examples, the list of problem codes also indicates whether the problem code from the message means that a software application or firmware file is outdated.

In some instances, the target RMM may have a list of current version identifiers for software, firmware, or other items that should be stored in the target boot device. The target RMM can compare the current version identifiers to existing version identifiers from the software, firmware, or other items actually stored on the target boot device. If the current version identifiers do not match the version identifiers for the items stored on the target boot device, then the target RMM can specify in the message which items from the target boot device are outdated. The target RMM can also include the version identifiers of the items in the message. The manager RMM then receives and reads the message. The manager RMM can then compare the version identifiers for the items specified in the message to corresponding version identifiers for corresponding items in the manager's boot device. If the manager RMM determines that the version identifiers of the items in the manager node's boot device are higher than the version identifiers in the message, then the manager RMM determines that the items from the target node's boot device are outdated.

The following description of flow 400 will first describe operations that occur when a failure is detected starting at processing block 406. Further below, processing block 420 of FIG. 5 will describe operations that occur when an update is required.

At processing block 406, the manager RMM determines whether the failure associated with the boot device problem is a software failure or a hardware failure. The manager RMM can detect whether the problem is a software failure or hardware failure based on the information provided in the message sent by the target RMM at processing block 407. For example, the manager RMM can detect a problem code in the message as described above in the description for processing block 404. For instance, for a software failure, the manager RMM may detect a problem code that indicates that the target node boot device includes a corrupt image of boot data, such as a corrupted version of an operating system for the node 111. In another instance, the manager RMM detects a problem code that indicates that there are bad sectors in a compact flash card used as the target node's boot device.

If the boot device problem is a software failure, then, at processing block 414, the manager RMM sends an instruction, via the management network, to the target RMM to format the target node boot device. Then, at processing block 409, the target RMM determines that it has received the instruction sent by the manager RMM to format the boot device. Further, at processing block 411, the target RMM formats the target node boot device. At processing block 413, the target RMM determines that the boot device has become accessible to be written to. For example, the target RMM determines that the formatting procedure has completed. At that point, the target node boot device would become accessible to be written to with new boot data. When the target node becomes accessible, then the target RMM proceeds to processing block 415 of FIG. 5.

Back at processing block 406, if the manager RMM determines that the boot device problem is related to hardware (e.g., the compact flash card of the target node boot device fails and/or is corrupted), then, at processing block 408, the manager RMM sends a message to an administrative account that the boot device of the target node has failed.

At processing block 410, the manager RMM, then sends an instruction to the target RMM to halt the target node sufficient to replace the boot device. The target RMM can receive the instruction and place the target node into a power state sufficient to have its boot device replaced. For instance, if the target node requires that all power to the target node be turned off before the boot device can be replaced, then the target RMM would receive the instruction to halt the target node and then power down the target node. In another example, if the target node can instead be in a suspended or stopped state, but still be powered on to some degree (e.g., a low-power state), then the target RMM could receive the instruction and place the target node into the suspended or stopped state. In some examples, the manager RMM may provide instructions to power down the target node regardless of whether the target RMM could provide a different powered state. In some aspects of the disclosure, the manager RMM may refer to a rule set of safety guidelines, business policies, recommended technical specifications, etc. The rule set may indicate that the target node be powered down completely.

At processing block, 412, the manager RMM then determines whether the target node boot device has been replaced. For example, the RMM can receive a notification that the target node boot device has been replaced. For instance, the manager RMM receives a notification from the administrative user account that a compact flash card of the target boot device was removed and replaced with a functional compact flash card. After receiving a notification, then the manager RMM sends an instruction to the target RMM to format the newly replaced target boot device at processing block 414. In other examples, the manager RMM can send an instruction to the target RMM target node to notify the manager RMM when the boot device has been replaced instead of waiting for a notification from an administrative user account.

At processing block 416, after the manager RMM has sent the instruction to the target RMM to format the target node boot device, the manager RMM detects that the target node boot device is accessible. For instance, the manager RMM receives a message from the target RMM that indicates that the target node boot device is formatted and can be written to. In some instances, the manager RMM can periodically send messages to the target RMM to check the status of the target boot device. In some aspects of the disclosure, the target RMM periodically checks the status of the target boot device to determine whether it is readable and then sends a message to the manager RMM when the boot device is readable. In yet other aspects of the disclosure, the target node boot device may include code that notifies the target RMM when it is readable, such as immediately after being formatted. The target RMM could receive that message and then sent a message to the manager RMM that the target node boot device is readable.

Figure 6:
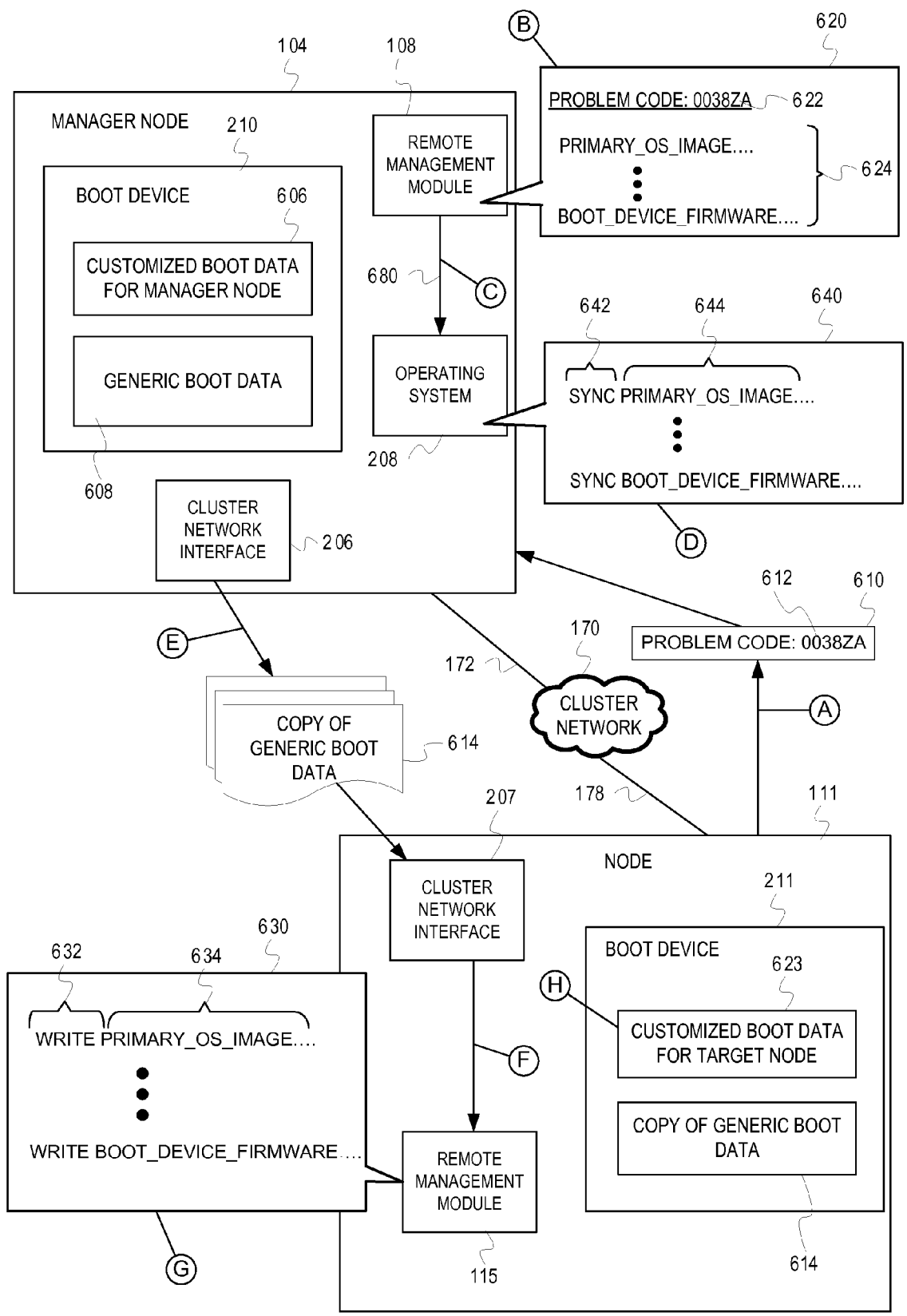
FIG. 6 depicts an example of providing to a target node, via a cluster network, specific portions of boot data selected from a manager node's boot device.

Referring now to FIG. 5, at processing block 418, after the manager RMM determines that the target node boot device is accessible, the manager RMM selects a portion of data from the boot device of the manager node (referred to as either the "manager node boot device" or "manager boot device"). The portion of the data from the manager node boot device includes boot data that can be used by the target node to resolve the problem with the target node boot device. In some aspects of the disclosure, the manager RMM includes instructions (e.g., a batch file(s), a script, etc.) to select items with certain file names from the manager boot device. The instructions covers a range of possible items to select from the manager boot device based on problem codes that the manager RMM receives regarding the problem with the target node boot device. For instance, if a problem code specifies that the target node boot device experiences a failure, then the manager RMM accesses and executes a portion of the instructions that selects all data from the manager node boot device that both the manager node and the target node use to boot. That data may include boot device firmware, a primary operating system image, a secondary operating system image, etc. If, on the other hand, the problem code indicates that the target node boot device had a problem with only one item of data, or only a few items of data, then the remote management module 108 would access a section of the instructions that selects only the one or few items of data. In another aspect of the disclosure, the manager RMM indicates one or more portions of the boot data that an operating system can select from the manager node boot device. For example, as illustrated in FIG. 6, at a first stage "A," the remote management module 108 receives a message 610 from the target node 111 about a problem with the boot device. The message may include a problem code 612 that may specify that the boot device 211 has experienced complete data corruption. The problem code 612 has a fictitious code identifier "0038ZA" for illustrative purposes. Afterwards, at stage "B," the remote management module 108 identifies, from a configuration file 620, a section 622 of the configuration file 620 that pertains to the code identifier 612. The section 622 specifies certain files 624 that should be selected from the boot device 210, which would resolve the problem with the boot device 211. Next, at stage "C," the remote management module 108 issues a command 680 to the operating system 208 to synchronize the files 624 specified within the section 622. The command 680 can specify file names for the files 624 that the operating system 208 should select and synchronize (e.g., copy and send). Those files 624 are included in the generic boot data 608.

The generic boot data 608 is data that is not customized or configured specifically for either the manager node 104 or the target node 111. The remote management module 108 does not select, or indicate for selection, customized boot data 606 which has been customized or configured to the hardware, software, or functionality of the manager node 104 or which is unique to the manager node 104. For example, the boot device 210 may include node specific data, such as a serial number for the manager node 104. The target node 111, however, would not need to use the serial number of the manager node 104 to configure the boot device 211. Thus, the configuration file 640 excludes data (e.g. files) that would include the serial number for the manager node 104. Therefore, regardless of which section of the configuration file 620 that the remote management module 108 accesses, the remote management module 108 would only access data (e.g., names of files) that would include non-configured boot data. Some examples of generic boot data used by both the manager node 104 and the target node 111 include boot images, boot device firmware files, etc. The remote management module 108 however, would not select customized or configuration data that is unique or custom to the manager node 104. Some examples of customized boot data that would not be selected from the manager node 104 include checksum related files, information related to specific devices connected to the manager node 104, or information related to a unique functionality of the manager node 104.

Referring back to FIG. 5, at processing block 422 the manager RMM transfers the selected portion of the boot data to the second node via a cluster network. For example, the manager RMM communicates to an operating system of the manager node to initiate a procedure that copies the non-configured boot data from the manager node boot device and transmits the copy of the non-configured boot data to the target node via the secure and high-speed cluster network. In some aspects of the disclosure, the manager RMM communicates with the operating system of the manager node through a serial connection using IPMI messaging. For example, referring to FIG. 6, as previously mentioned for stage "C," the remote management module 108 issued the command 680 to the operating system 208 to synchronize the files 624 specified within the section 622. At stage "D," the operating system 208 receives the command 680 and runs a program 640. The program 640 includes commands 642 to select some, or all, of the generic boot data 608 that pertains to the files 624. Then, at stage "E," the operating system 208 sends a copy of the generic boot data 614 through the cluster network 170 using the cluster network interface 206.

It should be noted that although the flow 400 shows that processing blocks 418 and 422 are performed after processing block 416, in other aspects of the disclosure, the operations of processing block 418 and/or 422 can be performed concurrently with processing block 416. For example, before detecting that the target node boot device is accessible, at processing block 416, the manager RMM can select the portions of the manager node's boot data mentioned at processing block 418. When the target node boot device becomes accessible, then the manager RMM could transfer the selected portion of the manager node's boot data to the target node. Further, in other aspects of the disclosure, the operations of processing block 422 can include broadcasting the copy of the boot data until receiving an indication from the target RMM that the copy had been received. After receiving the indication from the target RMM that the copy had been received, the manager RMM would terminate the broadcast of the selected portion of the manager node's boot data.

At processing block 415, the target RMM determines whether it has received the copy of the manager node's boot data. For example, as described earlier, the target RMM runs a diagnostic service. The service can communicate with a network scheduler and/or check a receive queue associated with a network interface controller, of the target node, connected to the cluster network. The service determines whether the network interface controller has received the copy of the manager node's boot data. When the target RMM determines that the network interface controller has received the copy of boot data, then the flow continues at processing block 417.

At processing block 417, after receiving the copy of the manager node's boot data (or after determining that the copy is available for access via the cluster network), the target RMM initiates a reboot of the target node.

At processing block 419, during the reboot of the target node, the target RMM accesses and uses the copy of the boot data from the manager node to configure the target node boot device (e.g., via connections on the target node's motherboard that utilize the I²C communications interface) and boot the target node. For example, as shown in FIG. 6, at stage "F," the cluster network interface 207 of the target node 111 receives the copy of the generic boot data 614. The remote management module 115 then accesses the copy 614 from the cluster network interface 207. At stage "G," the remote management module 115 initiates a write of the copy of the generic boot data 614 to the boot device 211. For example, the remote management module 115 determines instructions 630 that indicate commands 632 to write the file names of files 634 within the copy of the generic boot data 614. The remote management module 115 executes the instructions 630. The remote management module 115 can generate the instructions 630 based on the file names of files included within the copy of the generic boot data 614.

At stage "H," after the copy of the generic boot data 614 is written to the boot device 211, the target node 111 initiates a small computer program (e.g., the BIOS) which causes the boot device 211 to initiate boot loader instructions stored in the generic boot data 614. The boot loader accesses the image of the operating system also stored in the generic boot data 614 and loads the image of the operating system into the main memory of the target node 111. Concurrently, the remote management module 115 generates customized boot data 623 for the target node 111 (e.g., configures the boot device 211 with customized configuration files and settings unique to the hardware, software, or functionality of the target node 111). For example, the remote management module 115 includes a configuration program that customizes the boot device for the target node 111. The configuration program can detect information specific to the target node 111. For instance, the configuration program can read device information associated with hardware devices included in, or connected to, the target node 111. Some examples of device information includes firmware data of a device, device-specific configuration information, a unique identifier for a device such as a serial number or MAC address, a description of a function for a device, etc. The configuration program can then store that information in the customized boot data for the target node 623. The configuration program can further include one or more checksum algorithms to generate and store checksums in files when receiving and writing the copy of the generic boot data 614.

The checksum algorithms can verify data integrity and/or data authentication of the copy of the generic boot data 614.

Referring again to FIG. 5, at processing block 424, the manager RMM sends an instruction, via the management network, to reinitiate the diagnostic service on the target RMM.

At processing block 421, the target RMM determines whether it has received the instruction to initiate the diagnostic service. If so, the flow 400 continues at processing block 423 where the target RMM initiates the diagnostic service and sends a message to the manager RMM that indicates that the target node is functioning properly.

At processing block 426, the manager RMM receives the message that the target node is functioning properly. The diagnostic service then continues to run on both the manager RMM and the target RMM until another boot device problem is detected, at which point the flow 400 can return to processing block 405.

So far, the description of flow 400 has involved operations detecting a software or hardware failure. For example, the description has only described the processing blocks that followed decisional processing block 404 when a failure is detected. When a failure is detected, then the master RMM, at processing block 414, sends a command to the target RMM to format the target node boot device. However, at processing block 404, the master RMM can determine that the problem with the target node may be a problem that does not require formatting of the target node boot device. For example, the target node boot device may simply have an outdated or unsupported version of firmware, such as may be the case for a head swap procedure or a hardware upgrade of the target node. A head swap involves the replacement of one or more hardware components that causes a significant disruption to the overall operation of a node (e.g., replacement of controller heads, NVRAM cards, an entire controller motherboard, etc.). In such an example, the manager RMM would not need to perform an operation to instruct the target RMM to format the target node boot device. For instance, the processing block 402 may follow the replacement of a hardware component of the target node, such as in a head swap procedure. Therefore, at decisional processing block 404, the manager RMM determines that the problem with the target node boot device involves an outdated boot device setting or file that requires an update. The flow 400 then continues at processing block 420, where the manager RMM selects only a portion of the manager node's boot data that the target boot device requires to be updated. For instance, the manager RMM selects only some of the generic boot data from the manager boot device, such as only an outdated or unsupported version of firmware for the target boot device. At processing block 422, the manager RMM causes only the selected portion of the to the manager node's boot data to be sent to the target node via the cluster network (e.g., send only the outdated or unsupported version of the firmware for the target boot device). At processing block 419, the target RMM would only overwrite the portion of the boot data in the target node's boot device that required the update (e.g., the target RMM causes only the outdated or unsupported version of the firmware to be overwritten on the target node boot device).

In some aspects of the disclosure, immediately prior to processing block 420, the manager RMM may optionally send a message to an administrative user account, which message can be presented via a user interface of a remote device connected to the management network. The message may indicate, via the user interface, for the user to select an option to proceed with the update or not proceed with the update. Should the option be selected to proceed with the update, then the flow 400 would continue to processing block 420. If not, then the flow 400 would skip over processing blocks 420 and 422 and instead proceed directly to processing block 424.

As will be appreciated by one skilled in the art, aspects of the inventive subject matter may be embodied as a system, method or computer program product. Accordingly, aspects of the disclosure may take the form of hardware, software (including firmware, resident software, micro-code, etc.) or a combination of software and hardware aspects that may all generally be referred to herein as a "circuit," "module" or "system." Furthermore, aspects of the inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, an electromagnetic signal, an optical signal, an infrared signal, or any suitable combination thereof. A computer readable signal medium may be any computer readable medium that is not a computer readable storage medium and that can communicate, propagate, or transport a program for use by or in connection with a computer. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the inventive subject matter may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone computer, may execute in a distributed manner across multiple computers, and may execute on one computer while providing results and or accepting input on another computer.

Aspects of the inventive subject matter are described with reference to flowchart illustrations and/or block diagrams of methods, apparatus (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The term "computer" as used herein comprises any kind of computing system, machine, or device, including a personal computer, a laptop, a server, a tablet, a smartphone, a smartwatch, etc. A computer can also comprise a computing system that is communicatively coupled with other computer systems to form a set of computing systems that coordinate to perform functions similar to that of a single computing system.

Figure 7:
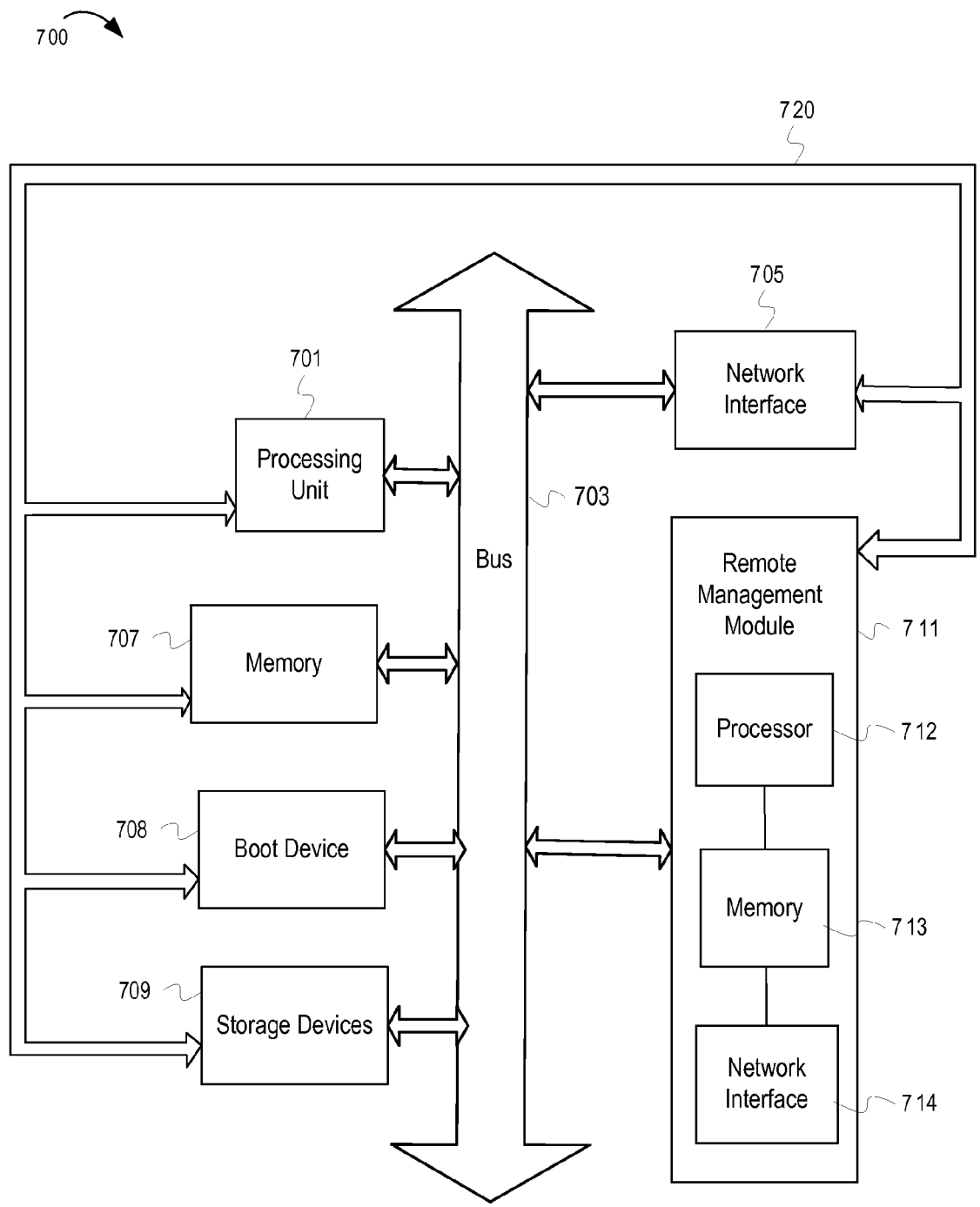
FIG. 7 depicts an example computer system with a remote management module.

FIG. 7 depicts an example computer system with a remote management module. A computer system 700 includes a processing unit 701 (possibly including multiple processors, multiple cores, multiple nodes, and/or implementing multithreading, etc.). The computer system includes memory 707. The memory 707 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 703 (e.g., PCI, ISA, PCI-Express, HyperTransport® bus, InfiniBand® bus, NuBus bus, etc.), a network interface 705 (e.g., an ATM interface, an Ethernet interface, a Frame Relay interface, SONET interface, wireless interface, etc.), and a storage device(s) 709 (e.g., optical storage, magnetic storage, etc.).

The system also includes a remote management module 711 configured with an additional processor 712, an additional memory 713, and an additional network interface 714 separate from the processing unit 701, the memory 707, and the network interface 705. The remote management module 711 is configured, in some aspects of the disclosure, to communicate via the network interface 714, with other remote management modules included in computer systems used as nodes in a clustered environment. The remote management module 711 is further configured, in some aspects of the disclosure, to detect one or more problems with a boot device of one or more of the nodes and, in response to communication in a management network between the remote management modules (e.g. made via the network interface 714), transmit a copy of boot data from a boot device 708 via a cluster network (e.g., via communications made via the network interface 705 through a private data network associated with a cluster of storage appliances).

In some aspects of the disclosure, the remote management module 711 is also configured to receive a portion of boot data from a manager node on a cluster network and use the portion of the boot data from the second node to configure the boot device 708. For example, the remote management module 711 connects to components of the computer system 700 via one or more secondary buses 720 (e.g., an I²C computer bus, a System Management Bus (SMB), an RS-232 serial console, an Intelligent Platform Management Bus (IPMB), etc.). In some examples, the one or more secondary buses 720 include one or more single-collision-domain segment, slow speed, network buses. The one or more secondary buses 720 are embedded into the same motherboard as the bus 703. In some examples, the remote management module 711 is configured to send serial communications to the components of the computer system 700 via the one or more secondary connections 720, such as when an operating system is non-functional.

In some aspects of the disclosure, any one or more of the functionalities described above, such as the functionalities of the remote management module 711, can be done with code embodied within the system memory 707. Thus, the system memory 707 may include one or more functionalities that facilitate providing boot data across nodes of a cluster network in response to diagnostic communications made via a management network. Further, any one of the functionalities may be partially (or entirely) implemented in hardware and/or on the processing unit 701. For example, the functionality may be implemented with an application specific integrated circuit, in logic implemented in the processing unit 701, in a co-processor on a peripheral device or card, etc. Further, realizations may include fewer or additional components not illustrated in FIG. 7 (e.g., video cards, audio cards, additional network interfaces, peripheral devices, etc.). The processor unit 701, the storage device(s) 709, and the network interface 705 are coupled to the bus 703. Although illustrated as being coupled to the bus 703, the memory 707 may be coupled to the processor unit 701.

While the aspects of the disclosure are described with reference to various implementations and exploitations, it will be understood that these aspects are illustrative and that the scope of the inventive subject matter is not limited to them. In general, techniques for providing boot data as described herein may be implemented with facilities consistent with any hardware system or hardware systems. Many variations, modifications, additions, and improvements are possible. For example, while the clustered storage system 101 is illustrated in FIG. 1 as having four nodes, the clustered storage system 101 can have any suitable number of nodes (i.e., two or more nodes). Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

Furthermore, it should be noted that clustered networks are not limited to any particular geographic area and can be clustered locally and/or remotely. Thus, in one aspect of the disclosure a clustered network can be distributed over a plurality (e.g., one or more) of storage systems and/or nodes located in a plurality (e.g., one or more) of geographic locations; while in another aspect of the disclosure a clustered network can include data storage systems residing in a same geographic location (e.g., in a single onsite rack of data storage devices).

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   determining, by a first management module of a first node, a problem with a boot device of a second node based, at least in part, on a communication received from a second management module of the second node, wherein the communication is received via a first network that operates in accordance with a first communications protocol and is different than a second network that operates in accordance with a second communications protocol used for data transfers among nodes of a cluster that include the first node and the second node;
   after determining the problem with the boot device of the second node, determining boot data that can be used to resolve the problem;
   selecting from a boot device of the first node the boot data that can be used to resolve the problem, wherein the boot data is used by the boot device of the first node to boot the first node; and
   providing, from the first node to the second node via the second network, a copy of the boot data selected from the boot device of the first node.

2. The method of claim 1, wherein the first management module is an out-of-band management microprocessor connected to a motherboard of the first node, and wherein the out-of-band management microprocessor is separate from a central processing unit connected to the motherboard of the first node.

3. The method of claim 1, wherein the second communications network is a network that operates in accordance with a cluster fabric protocol for transmitting data among the nodes of the cluster, wherein the first communications network is a network that operates in accordance with a non-cluster fabric protocol, and further comprising sending a message from the first management module to an operating system of the first node, wherein the message indicates for the operating system to provide of the copy of the boot data to the second node via the second communications network.

4. The method of claim 1, wherein the determining the problem with the boot device of the second node comprises determining one or more of corruption to data stored on the boot device of the second node and failure of hardware of the boot device of the second node.

5. The method of claim 4 further comprising:
   after determining the determining the one or more of the corruption to the data stored on the boot device of the second node and the failure of the hardware of the boot device of the second node, sending a command to the second management module to format the boot device of the second node.

6. The method of claim 1, wherein the determining the problem with the boot device of the second node comprises determining that the boot device of the second node requires an update to a portion of boot data of the boot device of the second node, and wherein the selecting the boot data from the boot device of the first node comprises selecting, as the portion of the boot data from the boot device of the first node, data that comprise an updated version of the portion of the boot data of the boot device of the second node that requires the update.

7. The method of claim 1, wherein the selecting the boot data from the boot device of the second node comprises selecting a portion of data of the boot device of the first node that is not configured specifically for the first node.

8. The method of claim 7, wherein the selecting the portion of the data of the boot device of the first node that is not configured specifically for the first node comprises:
   selecting data used to manage and boot the first node; and
   excluding data that is specific to the first node.

9. An apparatus comprising:
   a processor;
   a first network interface configured to communicate via a first network;
   a second network interface configured to communicate via a second network; and
   a machine-readable storage medium having computer usable program code executable by the processor to cause the apparatus to,
      receive a message transmitted via a management network;
      based on the message received via the first network interface from a secondary node of a computer cluster that includes the apparatus, determine a problem with a first boot device of the secondary node;
      determine that the problem with the first boot device is resolvable with a portion of boot data from a second boot device of a manager node of the computer cluster;
      select the portion of the boot data from the second boot device; and
      provide, via the second network interface, a copy of the portion of the boot data to the secondary node.

10. The apparatus of claim 9, wherein the computer usable program code executable by the processor to cause the apparatus to select the portion of the boot data from the second boot device comprises computer usable program code executable by the processor to cause the apparatus to select a portion of data of the second boot device that is not configured specifically for the manager node, wherein the portion of the data of the second boot device is required to boot the first node.

11. The apparatus of claim 10, wherein the second network uses a cluster fabric protocol for first type of communications between the secondary node and the manager node, and wherein the first network uses an Internet protocol for a second type of communications between the secondary node and the manager node, wherein the first type of communications are related to one or more of data storage and synchronization of data for a data storage system, and wherein the second type of communications are related to one or more of diagnostic, repair, and maintenance of the secondary node and the manager node.

12. The apparatus of claim 9, wherein the machine-readable storage medium has computer usable program code executable by the processor to cause the apparatus to:
   send an additional message to an operating system of the manager node via a serial connection within the manager node, wherein the additional message indicates for the operating system to provide the portion of boot data to the secondary node via the cluster network.

13. The apparatus of claim 12, wherein the computer usable program code executable by the processor to cause the apparatus to determine that the problem with the first boot device is resolvable with the portion of the boot data from the second boot device comprises computer usable program code executable by the processor to cause the apparatus to:
   determine that first data from the first boot device is problematic; and
   determine that second data in the portion of the second boot device corresponds to the first data.

14. The apparatus of claim 9, wherein the computer usable program code executable by the processor to cause the apparatus to detect the problem with the first boot device of the secondary node comprises computer usable program code executable by the processor to cause the apparatus to determine that the problem with the first boot device involves corruption to data stored on the first boot device, and wherein the machine-readable storage medium has computer usable program code executable by the processor to cause the apparatus to send a command to the secondary node to format the first boot device.

15. The apparatus of claim 14, wherein the machine-readable storage medium has computer usable program code executable by the processor to cause the apparatus to:
   after detection that the first boot device is formatted, send one or more commands to the operating system of the manager node to one or more of select the portion of boot data and provide the copy of the portion of the boot data to the secondary node via an interconnect channel of the cluster network.

16. The apparatus of claim 9, wherein the computer usable program code executable by the processor to cause the apparatus to detect the problem with the first boot device of the secondary node comprises computer usable program code executable by the processor to cause the apparatus to determine that the problem with the first boot device involves failure of a hardware component of the first boot device, and wherein the machine-readable storage medium has computer usable program code executable by the processor to cause the apparatus to:
   send a notification to an administrative user account regarding the failure of the hardware component; and
   after detection that the hardware component is replaced, send a command to the secondary node to format the first boot device.

17. The apparatus of claim 9, wherein the computer usable program code executable by the processor to cause the apparatus to detect the problem with the first boot device of the secondary node comprises computer usable program code executable by the processor to cause the apparatus to determine that the first boot device requires an update to a portion of the first boot device, and wherein the machine-readable storage medium has computer usable program code executable by the processor to cause the apparatus to:
   select, as the portion of the boot data from the second boot device, only data from the second boot device that is an updated version of the portion of the first boot device that requires the update.

18. A computer program product, the computer program product comprising:
   a computer readable storage medium having computer usable program code embodied therewith, the computer usable program code to,
      determine a problem with a boot device of a first node of a computer cluster,
      send a first communication, via a first communications network, to a management module of a second node of the computer cluster, wherein the first communication indicates the problem with the first boot device,
      receive a copy of boot data selected from a boot device of the second node, wherein the copy of the boot data is received via a second communication sent through a second communications network different from the first communications network, and wherein the boot data is required to solve the problem with the boot device of the first node; and
      write the copy of the boot data to the boot device of the first node.

19. The computer program product of claim 18, wherein the computer readable storage medium has computer usable program code to,
   initiate a diagnostic service in response to a third communication sent from the management module of the second node prior to the first communication.

20. The computer program product of claim 18, wherein the computer readable storage medium has computer usable program code configured to:
   determine that the problem with the boot device of the first node only pertains to a portion of data of the boot device of the first node; and
   overwrite only the portion of the data of the boot device of the first node with the copy of the boot data.

* * * * *